Sept. 19, 1950 R. E. KILLIP 2,522,876
EXPRESSING MACHINE CAGE
Filed May 31, 1944 2 Sheets-Sheet 1
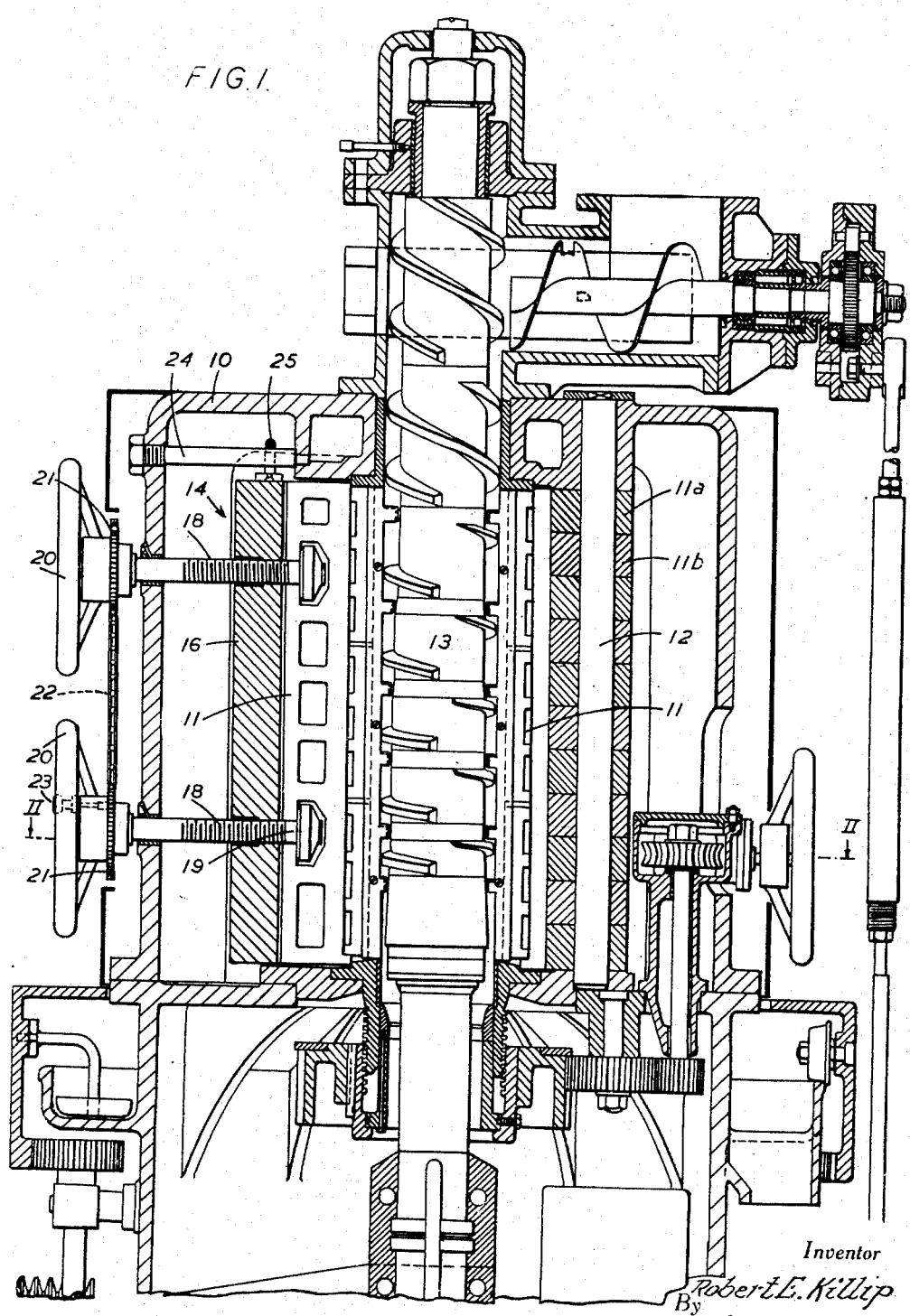
Inventor
Robert E. Killip
By
Attorney

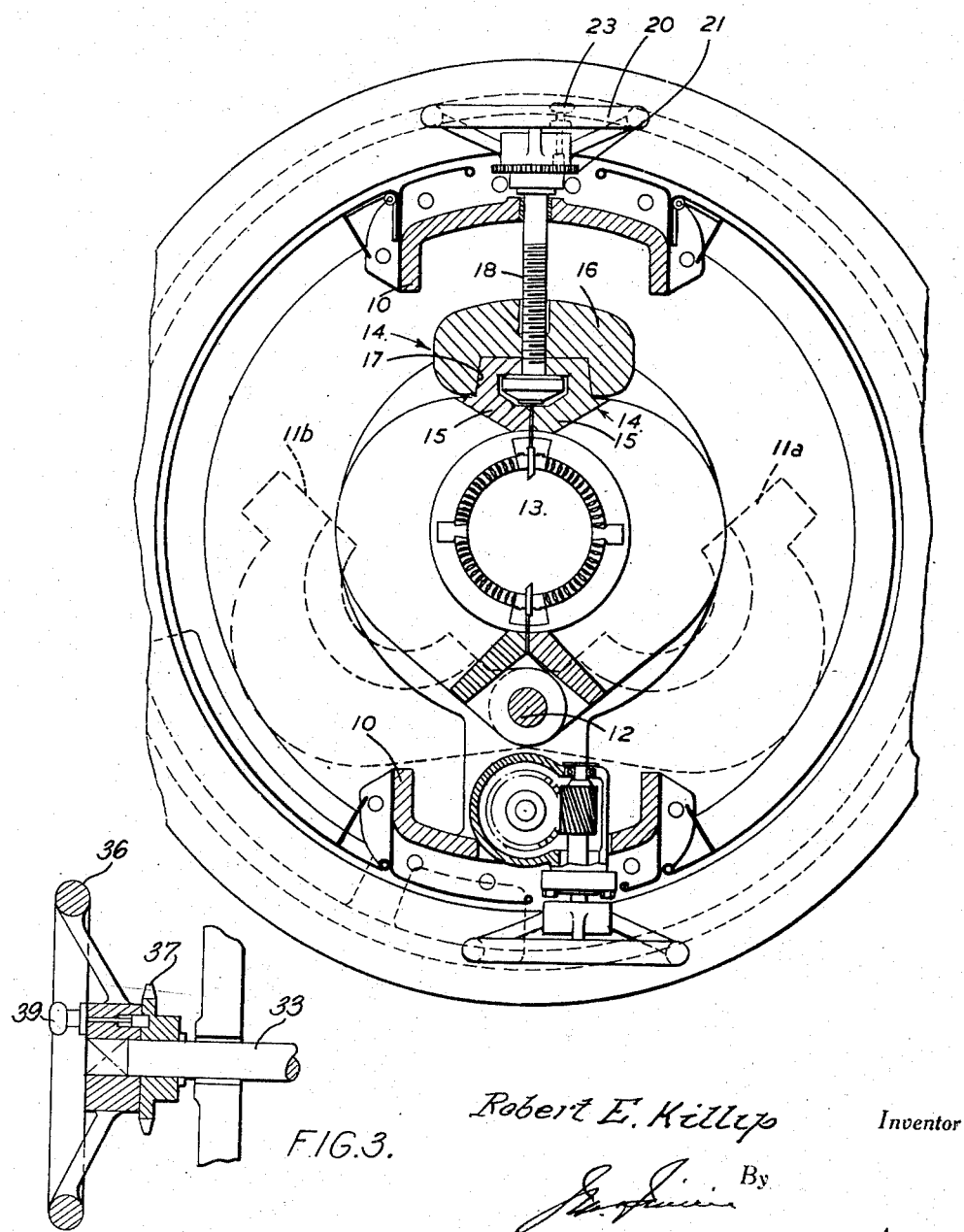

UNITED STATES PATENT OFFICE 2,522,876

EXPRESSING MACHINE CAGE

Robert Edward Killip, West Kirby, England, assignor to J. Bibby & Sons Limited, Liverpool, England, a British company Application May 31, 1944, Serial No. 538,147
In Great Britain June 1, 1943

12 Claims. (Cl. 100—48)

This invention is for improvements in or relating to a clamp for an expressing cage. Whilst the clamp, according to the present invention, has other applications it is designed more particularly for securing together the parts of the cage of an expressing machine such as is used for expressing oil from nut kernels. Expressing machines generally comprise a frame, a cage having pores or interstices in its walls and supported on said frame, and an extruding worm or impeller in said cage, the cage having an openable part or parts so as to provide access to the interior thereof for the purpose, for example, of relieving blockages and renewing or repairing the worm or any interior parts of the cage. Material to be treated is fed into the cage and is extruded therefrom through a restricted opening by the worm so that liquid matter in the material is expressed therefrom and exuded through the wall of the cage. The pressure within the cage is considerable and a robust yet simple means is required for securing the parts of the cage in the closed position. An object of the present invention is to provide such a means.

According to the present invention there is provided the combination with two members, at least one of which is of wedge formation, of a clamping means for clamping said members together comprising a clamping bar which embraces said members and has a complementary wedge part engaging the wedge member, and means for forcing the embrace of the clamping bar on said members to secure them together.

According to a further feature of the present invention there is provided an expressing machine having a cage in at least two relatively movable parts secured together at at least one of their meeting edges by a clamping arrangement comprising wedge members on the meeting edges of said parts and a U section clamping bar having a co-operating wedge-shaped interior, which embraces said members, and means for forcing the embrace of said clamping bar on said members.

The invention will be further described by way of example with reference to the accompanying drawings. On the drawings:

Figure 1 is a central vertical sectional view of an embodiment of the invention illustrating the cage of an expressing machine of the kind above set forth and described in detail in the specification of my co-pending application for Patent No. 538,145 filed May 31, 1944, and Figure 2 is a horizontal cross-sectional view on the line II—II of Figure 1.

Figure 3 is a detail section of the clutch.

On the drawings, 10 indicates the frame of the machine and 11 the cage which is in two parts, 11a and 11b, which are hinged together on a vertical hinge pin 12 secured in the frame. The cage houses an extruding worm 13. To open the cage so as to provide access to the worm and the interior parts of the cage the parts 11a and 11b are swung apart about the hinge pin 12 as shown in dotted lines in Figure 2. When the cage is closed these two parts are secured firmly together by a clamping arrangement 14. The clamping arrangement comprises abutting wedge-shaped members 15 extending along the meeting vertical edges of the cage and a U section clamping bar 16, of robust construction, arranged to embrace said members. The interior face 17 of the clamping bar is of wedge formation so as to co-operate with the wedge members in drawing the two halves of the cage together and the wedge faces have a small degree of inclination so that a considerable clamping pressure is obtainable. Two screws 18 are screwed through the clamping bar 16 and have collars 19 at their ends which are trapped between the meeting edges of the cage to hold the screws against movement in an axial direction. Each screw is provided with an operating hand-wheel 20 and a sprocket wheel 21, the sprocket wheels being geared together by a chain 22. One of the sprocket wheels, at least, is loose on its screw but can be secured thereto by a clutch pin 23. It will be appreciated that rotation of the hand-wheels in one direction will force the clamping bar firmly onto the wedge members and secure the two parts of the cage together, whereas rotation in the opposite direction will draw the clamping bar off the wedge members and permit the cage to be opened. During the final closing movement and the initial opening movement it is preferable to release the clutch pin 23 so that the screws can be operated independently, but for effecting the major amount of movement of the clamping bar the clutch pin 23 should be engaged so that the two screws are operated simultaneously by rotation of one hand-wheel. The weight of the clamping bar is taken by a rail 24 from which the bar is suspended by a slidable runner 25.

I claim:

1. An expressing machine having a cage in at least two relatively movable parts secured together at at least one of their meeting edges by a clamping arrangement comprising wedge members on the meeting edges of said parts, a U section clamping bar having a co-operating wedge-shaped interior which embraces said members, and a screw screwed through said clamping bar and having its inner end trapped between the wedge members, whereby it is held against movement in an axial direction and when turned about its axis forces the embrace of the clamping bar on the wedge members so as to secure the parts of the cage together.

2. An expressing machine as claimed in claim 1 and having at least two screws screwed through the clamping bar for applying its embrace to the wedge members, means gearing said screws together for simultaneous operation, and means for disconnecting said gearing to permit independent operation of said screws.

3. An expressing machine as claimed in claim 1, wherein the wedge faces have a small degree of inclination for the purpose described.

4. An expressing machine as claimed in claim 1, and further comprising a support for the clamping bar and means slidably connecting the clamping bar to said support.

5. In combination with a vertical cage having two openable parts, a vertical hinge forming an axis for opening and closing movements of the cage parts, each cage part diametrically opposite the hinge having a projection with an inclined face, and an independent and manually operable clamping bar to cooperate with the projections when the cage parts are closed, said bar embracing the projections and having complementary inclined faces to engage the inclined faces of the projections of the cage parts to wedge said cage parts in cage-closing positions.

6. A construction as defined in claim 5, wherein the clamping bar has threaded connection with an operating member, with said member having a head to seat in a recess formed jointly in the meeting faces of the projections, and wherein means are provided for manually turning said member to move the bar into and out of wedging engagement with both said projections.

7. An expressing machine having a cage divided longitudinally into at least two relatively openable parts and an arrangement for securing said parts together at at least one of their longitudinal meeting edges comprising embraceable wedge members on and extending for at least a substantial portion of the length of the meeting edges of said parts, a U section clamping bar having a co-operating wedge shaped interior, which embraces said wedge members for at least a substantial part of the length thereof, and means for forcing the embrace of said clamping bar on said wedge members.

8. An expressing machine having a cage divided longitudinally into at least two relatively openable parts and an arrangement for securing said parts together at at least one of their meeting edges comprising embraceable wedge members on and extending for the whole of the length of the meeting edges of said parts, a U section clamping bar having a co-operating wedge-shaped interior which embraces said members for the whole of the length thereof, and at least one screw screwed through said clamping bar and having its forward end trapped between the wedge members, whereby it is held against movement in an axial direction and when turned about its axis forces the embrace of the clamping bar on the wedge members so as to secure the parts of the cage together.

9. An expressing machine as claimed in claim 8, and having at least two screws screwed through the clamping bar for applying its embrace to the wedge members, means for gearing said screws together for simultaneous operation, and means for disconnecting said gearing to permit independent operation of said screws.

10. An expressing machine as claimed in claim 8, wherein the wedge faces have a small degree of inclination for the purposes described.

11. An expressing machine of the type specified and including a cage having its axis arranged vertically and comprising at least two parts each having a series of hinging members on one of its edges, a hinge pin passing vertically through said hinging members for opening movement of at least one of the cage parts in a substantially horizontal direction, the hinging members on one cage part interfitting with the hinging members on the other part so that the hinge pin is in multiple shear, a readily releasable clamping bar engaging the meeting edges of the cage for substantially the whole of the length thereof to secure the cage in the closed condition, and means supporting said clamping bar for movement into and out of engagement with the cage.

12. An expressing machine as claimed in claim 11, wherein the hinging members of one cage part abut at top and bottom on the hinging members of the other part.

ROBERT EDWARD KILLIP.

REFERENCES CITED

The following references are of record in the file of this patent:

UNITED STATES PATENTS

| Number | Name | Date |
|---|---|---|
| 152,014 | Seeburger | June 16, 1874 |
| 422,064 | Bayles | Feb. 25, 1890 |
| 730,423 | Wells | June 9, 1903 |
| 773,945 | Kronauer | Nov. 1, 1904 |
| 869,327 | Park | Oct. 29, 1907 |
| 1,006,593 | Pleasant | Oct. 24, 1911 |
| 1,143,849 | Morris | June 22, 1915 |
| 1,293,549 | Reid | Feb. 4, 1919 |
| 1,438,160 | State | Dec. 5, 1922 |
| 1,482,049 | Swanson | Jan. 29, 1924 |
| 2,182,201 | Harris | Dec. 5, 1939 |

FOREIGN PATENTS

| Number | Country | Date |
|---|---|---|
| 24,543 | Great Britain | of 1910 |